May 25, 1948.    S. E. BRILLHART ET AL    2,441,988
APPARATUS FOR MOLDING ARTICLES
Filed Sept. 27, 1945
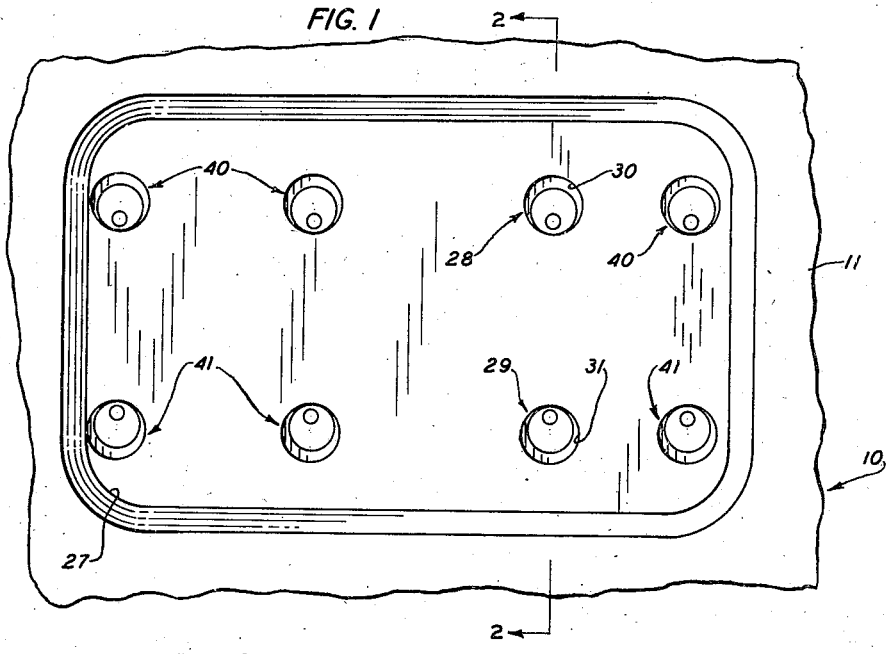
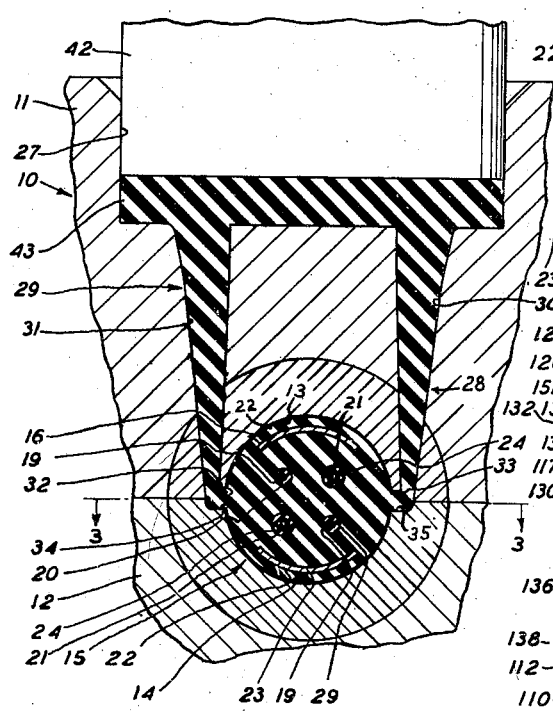
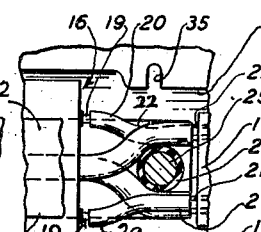
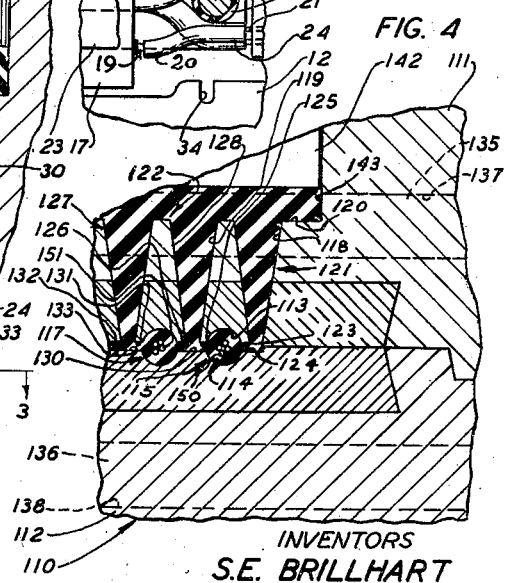
INVENTORS
S.E. BRILLHART
L.V. MOSHER
BY
ATTORNEY Patented May 25, 1948

2,441,988

UNITED STATES PATENT OFFICE 2,441,988

APPARATUS FOR MOLDING ARTICLES

Samuel E. Brillhart, Lutherville, and Leslie V. Mosher, Baltimore, Md., assignors to Western Electric Company, Incorporated, New York, N. Y., a corporation of New York Application September 27, 1945, Serial No. 618,892

5 Claims. (Cl. 18—36)

This invention relates to apparatus for molding articles, and has for its object the provision of new and improved apparatus for molding articles.

In the manufacture of the articles having molding material molded around flexible cores, it is essential in many instances that the cores be not displaced as the molding material is molded thereover. To prevent displacement of the cores, the pressure of the molding material on the cores must be balanced.

An apparatus for molding articles, which forms one embodiment of the invention, includes a pair of separable mold sections having a single extrusion chamber and a mold cavity formed therein and also provided with diametrically opposed sprues leading from the extrusion chamber and directed toward the center line of the cavity.

In practicing the invention, a flexible core is placed in a mold cavity formed in a pair of separable mold sections. Molding material then is forced by a ram from a single extrusion chamber through sprues into the mold cavity. The outlets of the sprues are positioned along the line of separation of the mold sections and are directed oppositely to each other so that the pressure of the molding material upon the core is balanced and the core is not displaced in the cavity during the molding operation.

A complete understanding of the invention may be obtained from the following detailed description of apparatus forming specific embodiments thereof, when read in conjunction with the appended drawing, in which:

Fig. 1 is a fragmentary, top plan view of an apparatus forming one embodiment of the invention;

Fig. 2 is a fragmentary, vertical section taken along line 2—2 of Fig. 1;

Fig. 3 is a fragmentary, horizontal section taken along line 3—3 of Fig. 2, and

Fig. 4 is a fragmentary, vertical section of an apparatus forming a second embodiment of the invention.

Referring now in detail to the drawing, a mold 10 includes an upper mold section 11 and a lower mold section 12 (Fig. 2). The mold sections 11 and 12 are provided with mold recesses 13 and 14, respectively, which form a mold cavity 15 designed to receive a skeleton terminal 16. The skeleton terminal 16 includes a loading coil 17 (Fig. 3) and a fiber terminal base 18. Conductors 19—19 extend slackly from the loading coil to the terminal base, pass through the fiber terminal base and are secured to cable connectors (not shown). Insulating sleeves 20—20 are positioned on the conductors 19—19. Conductors 21—21 pass between the loading coil and arms 22—22 of a yoke 23, extend slackly from the edge of the coil to the terminal base which they pass through and are connected to cable connectors (not shown). Insulating sleeves 24—24 cover the conductors 21—21. The sleeves 20—20 and 24—24 pass around and are held away from a transverse pin 25 by an insulating bushing 26.

The upper mold section 11 is provided with an extrusion chamber 27, and a pair of sprues 28 and 29 are formed in the mold sections 11 and 12 with the outlets thereof positioned on opposite sides of the mold cavity 15. The sprues 28 and 29 include tapered passages 30 and 31 and semicylindrical grooves 32 and 33, respectively, formed in the upper mold section. The sprues 28 and 29 also include semicylindrical grooves 34 and 35 which are formed in the lower mold section below the grooves 32 and 33, respectively. The semicylindrical grooves 32 and 34 form a passage which is positioned at the junction of the mold sections and is directed toward the center line of the mold cavity 15, and the semicylindrical grooves 33 and 35 form a passage which is positioned at the junction of the mold sections and is aligned with the passage formed by the semicylindrical grooves 32 and 34. In other words, the outlet of the passage formed by the grooves 32 and 34 is directly opposed to the outlet of the passage formed by the grooves 33 and 35. Outlets of sprues 40—40 (Fig. 1), which are identical with the sprue 28, and outlets of sprues 41—41, which are identical with the sprue 29 and whose outlets are directed opposite to the outlets of the sprues 40—40, are spaced along opposite sides of the mold cavity 15.

A ram 42 is designed to enter the extrusion chamber 27 and to force molding material 43, which includes rubber, or a rubberlike material, through the sprues 28, 29, 40—40 and 41—41. The molding material flows around the elements of the terminal 16, and since it is directed into the mold cavity from opposite sides, it flows around and keeps separated the slack conductors 19—19 and 21—21 and does not force them against the arms 22—22 of the yoke 23, and thus maintains the spacing of the conductors from each other and from the arms 22—22.

In the operation of the mold 10, the skeleton terminal 16 is placed in the recess 14 formed in the lower mold section 12, the upper mold section 11 is placed over the lower mold section 12 in a position so that the recess 13 and the recess 14 form the mold cavity 15. A quantity of the molding material 43 then is placed in the extrusion chamber 27 of the mold section 11, and the mold sections 11 and 12 are heated by well known heating means (not shown), such as cartridge type resistance heaters, steam platens, or the like. The ram 42 then is moved into the extrusion chamber 27 and forces the molding material 43 through the sprues 28, 29, 40—40 and 41—41 until the molding material completely covers the skeleton terminal 16.

As the molding material is forced into the mold cavity 15, the pressure thereof on the elements of the skeleton terminal 16 is balanced because the outlets of the sprues 28 and 29 are aligned and are directed toward the center line of the molding cavity 15, and the corresponding passages (not shown) of the sprues 40—40 are directed toward the center line of the molding cavity 15 and are aligned with the outlet passages (not shown) of the sprues 41—41. The outlet passages of the sprues 40—40 and 41—41 are positioned at the junction of the mold sections. The sprues 28, 29, 40—40 and 41—41 are so placed along the mold 10 that the molding material 43 flows into the mold cavity 15 and completely fills the void space in the cavity. The mold sections 11 and 12 then are opened and the molded terminal is removed therefrom and is vulcanized by suitable vulcanizing equipment (not shown).

The apparatus described hereinabove prevents bunching of the conductors 19—19 and 21—21 and the sleeves 20—20 and 24—24, and also prevents movement of these sleeves into contact with the arms 22—22 of the yoke 23.

While the molding material 43 described hereinabove is a rubber or a rubber-like compound, the apparatus described hereinabove could be used to mold other thermosetting materials or thermoplastic materials. Also, the mold 10 could be used to completely cure thermosetting molding materials where such curing is required at the time of the molding.

The mold 10 provides balanced pressure of the molding material being extruded from the oppositely directed sprues while the mold has only the single extrusion chamber and is simple in construction and operation.

A mold 110 (Fig. 4) forming an alternative embodiment of the invention includes mold sections 111 and 112 having mold recesses 113 and 114, respectively, forming a mold cavity 115. The mold sections 111 and 112 also include mold cavities illustrated by a mold cavity 117, positioned to the left, as viewed in Fig. 4, of the mold cavity 115. An extrusion chamber 120 is formed in the mold section 111, and short sprues 121, 122 and 127 connect the extrusion chamber 120 with the mold cavities 115 and 117. These sprues include short tapered passages 118, 119 and 128, respectively, and a semicylindrical groove 123 in the mold section 111 and a semicylindrical groove 124 in the mold section 112 form a passage whose outlet is directed toward the center line of the mold cavity 115 and which extends along the junction of the mold sections to that mold cavity.

The mold section 111 has semicylindrical grooves 125 and 126 leading from the passage 119 to the mold cavities 115 and 117, respectively. The grooves 125 and 126 form with a groove 130, which is formed in the mold section 112, passages whose outlets are opposed and are directed toward the center lines of the mold cavities 115 and 117, respectively, the passage formed by the grooves 125 and 130 being aligned with the passage formed by the grooves 123 and 124. These passages are positioned at the junction of the mold sections 111 and 112.

The sprue 127 includes passages formed by semicylindrical grooves 131, 132 and 133, the outlets of which are directed toward the center lines of the mold cavity 117 and the mold cavity (not shown) just to the left of the mold cavity 117, as viewed in Fig. 4. The passage formed by the grooves 131 and 133 is aligned with the passage formed by the grooves 126 and 130 and both of these passages extend along the junction of the mold sections 111 and 112. Sprues (not shown) having oppositely directed aligned outlets and being similar to the sprues 121, 122 and those illustrated by the sprue 127 are spaced along the lengths of the mold cavity 115 and the cavities illustrated by the mold cavity 117.

Resistance heating elements 135 and 136 are positioned in bores 137 and 138, respectively, formed in the mold sections 111 and 112, respectively, and heat the mold sections in order to vulcanize molding material 143. A ram 142 is provided to force the molding material from the extrusion chamber 120 through the sprues 121, 122, 127 and those spaced along the cavity 115 and the cavities illustrated by the cavity 117.

In the use of the mold 110, a bare portion, such as a spliced portion, of a flexible conductor 150 is placed in the mold recess 114 and bare portions of flexible conductors illustrated by a flexible conductor 151 are placed in the lower halves of the mold cavities, illustrated by the mold cavity 117. The mold sections 111 and 112 then are assembled with the bare conductors centered in the mold cavities formed thereby.

The ram 142 then is actuated to force the molding material 143 through the sprues 121 and 122, the sprues illustrated by the sprue 127 and the sprues (not shown) similar thereto which are spaced along the mold cavity 115 and the mold cavities illustrated by the mold cavity 117. The outlets of these sprues direct the molding material into those mold cavities in opposed streams so that the pressures of the molding material upon opposite sides of the conductor 150 and those conductors illustrated by the conductor 151 are balanced and the conductors are held in centered positions in the mold cavities. Thus, insulating covers of uniform thickness are formed over the conductors in the mold 110. The heat of the mold sections 111 and 112, which are heated by the heating elements 135 and 136, respectively, then vulcanizes the molding material surrounding the conductors in the mold 110.

The mold sections 111 and 112 then are separated, the conductor 150 and the conductors illustrated by the conductor 151 are removed from the mold 110, and the short sprues formed therein are cleaned. The mold 110 then may be used to mold covers over another group of conductors similar to the conductors 150 and 151.

In the last-described apparatus for molding articles, the conductors 150 and 151 are held against displacement in the mold cavities 115 and 117 by the oppositely directed streams of the molding material 143. Thus, the covers formed therearound are uniform in thickness. The shortness of the short sprues of the mold sections 111 and 112 facilitates cleaning the waste molding material from the sprues after a molding operation and minimises the amount of waste molding material. Also, with the above-outlined construction, only a single extrusion chamber is needed to obtain balanced pressure of the molding material on all of the flexible conductors.

The molds 10 and 110 may be used in any suitable type of molding presses. One such molding press is disclosed and claimed in copending application Serial No. 547,120, filed July 29, 1944, now Patent No. 2,428,275.

What is claimed is:

1. A mold, which comprises an upper mold section provided with a mold recess, an extrusion chamber and a pair of passages connecting the extrusion chamber with the mold recess, and a lower mold section provided with a mold recess identical with and complementary to the first-mentioned mold recess for forming therewith a mold cavity for receiving a flexible core element in the central portion thereof and a pair of grooves for forming sprues with the passages, the outlets of said sprues being oppositely directed toward the center line of the mold cavity and extending along the parting plane of the mold sections, whereby the pressure of molding material forced from the extrusion chamber through the sprues into the mold cavity against opposite sides of the flexible core element positioned in the central portion of the mold cavity is balanced.

2. A mold, which comprises a pair of mold sections separable along a single plane thereof and provided with an elongated mold cavity whose axis lies in said plane for receiving in the central portion thereof a plurality of elongated flexible core elements to be held therein in slack condition, one of said mold sections being provided with an extrusion chamber and a plurality of spaced pairs of parallel passages extending from the extrusion chamber to points on the parting plane of the mold sections, one of the passages of each pair being positioned on the opposite side of the axis of mold cavity from the other passage, said mold sections being provided with oppositely directed aligned passages extending along the parting plane of the mold sections from the pairs of parallel passages to the mold cavity for directing molding material into the mold cavity in opposed streams to prevent dislocation of the elongated flexible core elements.

3. A mold, which comprises an upper mold section provided with an elongated mold recess opening into the bottom thereof, an extrusion chamber positioned above the mold recess, a plurality of parallel extrusion passages leading downwardly from the extrusion chamber to points on the bottom of the mold section spaced along one side of the mold recess and a plurality of semicylindrical grooves formed along the bottom of the mold section in communication with the extrusion passages and the mold recess, said upper mold section also being provided with a plurality of parallel extrusion passages leading downwardly from the extrusion chamber to points on the bottom of the mold section spaced along the other side of the mold recess and a plurality of semicylindrical grooves formed along the bottom of the mold section in communication with the last-mentioned extrusion passages and the mold recess, each of said last-mentioned semi-cylindrical grooves being aligned with one of the first-mentioned semi-cylindrical grooves, and a lower mold section fitting against the bottom of the upper mold section and being provided with a mold recess complementary to the first-mentioned mold recess for forming therewith an elongated mold cavity for receiving a plurality of flexible conductors in the central portion thereof, said lower mold section also being provided with a plurality of aligned semicylindrical grooves forming opposed aligned passages with the grooves in the upper mold section so that molding material forced through the passages enters the mold cavity in opposite streams, whereby dislocation of the conductors is prevented.

4. A mold, which comprises a pair of separable mold sections having formed therein a plurality of parallel mold cavities extending along the parting plane thereof, each of said mold cavities being designed to receive a splice of a conductor in the center thereof, one of said mold sections being provided with a single extrusion chamber, said mold sections also being provided with L-shaped sprues extending from the outside edges of the outside mold cavities to the extrusion chamber with the outlets thereof directed along the parting plane of the mold sections and a T-shaped sprue extending from adjacent edges of two of the mold cavities to the extrusion chamber with the outlets thereof directed along the parting plane thereof.

5. A mold, which comprises an upper mold section, and a lower mold section in operative engagement with the upper mold section along a parting plane of the mold sections, said mold sections being provided with a plurality of elongated mold cavities whose axes extend side by side along the parting plane of the mold sections, each of said cavities being designed to receive a conductor splice in a position in which the conductor splice extends along the axis of the cavity, said upper mold section being provided with a single extrusion chamber, said mold sections being provided with an L-shaped sprue leading from the extrusion chamber to an outside edge of one of the outside mold cavities, the outlet passage of said sprue being directed along the parting plane toward the centerline of the last-mentioned mold cavity, said mold sections also being provided with a T-shaped sprue leading from the extrusion chamber and having an outlet passage aligned with the outlet passage of the L-shaped sprue and opening into the last-mentioned mold cavity so that material forced through the sprues enters the last-mentioned mold cavity in aligned streams, whereby displacement of the conductor splice is prevented, said T-shaped sprue also having a second outlet passage extending in an opposite direction from the first outlet passage of the T-shaped sprue into the mold cavity most adjacent to the last-mentioned mold cavity.

SAMUEL E. BRILLHART.
LESLIE V. MOSHER.

REFERENCES CITED

The following references are of record in the file of this patent:

UNITED STATES PATENTS

| Number | Name | Date |
|---|---|---|
| 2,017,216 | Marcus | Oct. 15, 1935 |
| 2,031,786 | Oldham | Feb. 25, 1936 |
| 2,254,233 | Meyer | Sept. 2, 1941 |
| 2,347,773 | Franz | May 2, 1944 |
| 2,360,023 | Tucker | Oct. 10, 1944 |
| 2,361,348 | Dickson et al. | Oct. 24, 1944 |